(12) United States Patent
Qiu et al.

(10) Patent No.: US 7,453,246 B2
(45) Date of Patent: Nov. 18, 2008

(54) ADAPTIVE PWM PULSE POSITIONING FOR FAST TRANSIENT RESPONSE

(75) Inventors: Weihong Qiu, San Jose, CA (US); Robert H. Isham, Flemington, NJ (US); Zhixiang Liang, Portland, OR (US)

(73) Assignee: Intersil Americas Inc., Milpitas, CA (US)

( * ) Notice: Subject to any disclaimer, the term of this patent is extended or adjusted under 35 U.S.C. 154(b) by 193 days.

(21) Appl. No.: 11/383,878

(22) Filed: May 17, 2006

(65) Prior Publication Data

US 2007/0109825 A1    May 17, 2007

Related U.S. Application Data

(60) Provisional application No. 60/737,523, filed on Nov. 16, 2005, provisional application No. 60/774,459, filed on Feb. 17, 2006.

(51) Int. Cl.
*G05F 1/56* (2006.01)
(52) U.S. Cl. ............... 323/282; 327/175; 363/41
(58) Field of Classification Search ............... 323/282, 323/283, 288; 327/175; 363/41
See application file for complete search history.

(56) References Cited

U.S. PATENT DOCUMENTS

| 3,879,647 | A | * | 4/1975 | Hamilton et al. | 363/16 |
|---|---|---|---|---|---|
| 4,468,569 | A | * | 8/1984 | Norris | 290/1 R |
| 5,742,151 | A | * | 4/1998 | Hwang | 323/222 |
| 6,836,103 | B2 | * | 12/2004 | Brooks et al. | 323/282 |
| 7,109,692 | B1 | * | 9/2006 | Wu et al. | 323/282 |
| 7,187,567 | B2 | * | 3/2007 | Westcott | 363/132 |
| 2003/0222627 | A1 | * | 12/2003 | Hwang | 323/222 |
| 2006/0055387 | A1 | * | 3/2006 | Steele | 323/283 |
| 2006/0055388 | A1 | * | 3/2006 | Tang et al. | 323/284 |
| 2006/0055389 | A1 | * | 3/2006 | Rice | 323/288 |
| 2007/0013356 | A1 | * | 1/2007 | Qiu et al. | 323/288 |

* cited by examiner

*Primary Examiner*—Jeffrey L Sterrett
(74) *Attorney, Agent, or Firm*—Gary R Stanford

(57) ABSTRACT

An adaptive pulse positioning system for a voltage converter providing an output voltage, the system including a PWM generation circuit, a sensor, and a pulse positioning circuit. The PWM generation circuit generates a PWM signal with PWM pulses for controlling the output voltage of the voltage controller. The sensor senses an output load condition of the voltage converter and provides a load signal indicative thereof. The pulse positioning circuit adaptively positions the PWM pulses based on the load signal. A method of adaptively positioning PWM pulses that are used to control an output voltage of a voltage regulator including generating a series of PWM pulses based on a clock signal, sensing an output load condition, and adaptively shifting the series of PWM pulses based on the output load condition.

20 Claims, 8 Drawing Sheets

ADAPTIVE PWM PULSE POSITIONING FOR FAST TRANSIENT RESPONSE

CROSS-REFERENCE TO RELATED APPLICATIONS

The present application claims the benefit of U.S. Provisional Application No. 60/737,523 filed on Nov. 16, 2005, and also claims benefit of U.S. Provisional Application No. 60/774,459 filed on Feb. 17, 2006, in which both are herein incorporated by reference for all intents and purposes.

BACKGROUND OF THE INVENTION

1. Field of the Invention

The present invention relates to power regulators, and more particularly to adaptive PWM pulse positioning for fast transient response by reducing the blank period between cycles.

2. Description of the Related Art

The load current of modern circuits including the modern central processing unit (CPU) is highly dynamic and changes very quickly from low to high and from high to low. A CPU current transient may occur within 1 microsecond (µs), for example, which is less than the typical switching period of conventional voltage regulators. It is desired to provide a DC-DC power regulator with a control loop that has sufficient response time to fast load transitions whenever they occur.

In many conventional pulse-width modulation (PWM) schemes, the compensation output of an error amplifier is typically compared to a fixed ramp signal by a PWM comparator. The PWM comparator generates a PWM signal used to control switching of a DC-DC power regulator. To provide switching noise immunity, a reset-set (R-S) flip-flop is often coupled to the output of the comparator to ensure that there is only one pulse for each switching cycle. In a leading-edge modulation scheme, each PWM pulse is initiated based on the comparator output and terminated synchronous with a clock signal. The leading-edge modulation scheme is good for the load-adding transient event but not always responsive to a load-releasing transient. In a trailing-edge modulation scheme, each PWM pulse is initiated synchronous with a clock signal and terminated based on the comparator output. The trailing-edge modulation scheme is good for the load-releasing transient event but not always responsive to a load-adding transient event. In a conventional dual-edge modulation scheme, the ramp is a triangular waveform so that each PWM pulse begins and ends based on a comparison of the triangular waveform with the compensation signal. The conventional dual-edge modulation scheme, however, also exhibits turn-on or turn-off delays since the ramp is fixed and since the leading-edge of the PWM pulse occurs only in the first half cycle while the trailing-edge only occurs in the second half cycle. Each of these conventional schemes, therefore, insert clock signal delays under certain load varying situations.

SUMMARY OF THE INVENTION

An adaptive pulse positioning system for a voltage converter providing an output voltage according to an embodiment of the present invention includes a pulse width modulation (PWM) generation circuit, a sensor, and a pulse positioning circuit. The PWM generation circuit generates a PWM signal with PWM pulses for controlling the output voltage of the voltage controller. The sensor senses an output load condition of the voltage converter and provides a load signal indicative thereof. The pulse positioning circuit adaptively positions the PWM pulses based on the load signal.

In one embodiment, the pulse positioning circuit includes a delay function having a first input receiving the load signal, a second input receiving a first clock signal, and an output providing a delayed clock signal having a delay based on the load signal. In this case, the PWM generation circuit controls timing of the PWM pulses based on the delayed clock signal. In more specific embodiments, the PWM generation circuit may include an error amplifier, a signal generator, a comparator, and PWM logic. The error amplifier provides a compensation signal indicative of error of the output voltage of the voltage controller. The signal generator has an input which receives the delayed clock signal and an output which provides a ramp signal. The comparator compares the compensation signal with the ramp signal and generates a PWM control signal indicative thereof. The PWM logic has a first input receiving the delayed clock signal, a second input receiving the PWM control signal and an output providing the PWM signal. Various modulator configurations are contemplated, including trailing edge modulators, dual edge modulators, etc.

In another embodiment, a dual-ramp dual-edge PWM modulation circuit is contemplated. In this case, the PWM generation circuit includes first and second ramp generators, an error amplifier, first and second comparators, and pulse control logic. The first ramp generator provides a leading-edge ramp signal synchronous with a clock signal. The error amplifier provides a compensation signal indicative of error of the output voltage of the voltage controller. The first comparator compares the leading-edge ramp signal with the compensation signal and asserts a set signal indicative thereof. The second ramp generator provides a trailing-edge ramp signal that begins ramping when the set signal is asserted. The second comparator compares the trailing-edge ramp signal with the compensation signal and asserts a reset signal indicative thereof. The pulse control logic asserts the PWM signal when the set signal is asserted and de-asserts the PWM signal when the reset signal is asserted.

For the dual-ramp dual-edge embodiments, several configurations are contemplated for the pulse positioning circuit. In a first embodiment, the pulse positioning circuit has a first input receiving the compensation signal, a second input receiving the load signal and an output providing a second compensation signal. The second compensation signal is provided to the first comparator rather than the compensation signal. In this case, the pulse positioning circuit adaptively adjusts the second compensation signal based on the load signal. In another embodiment, the pulse positioning circuit has a first input receiving the leading-edge ramp signal, a second input receiving the load signal and an output providing a second leading-edge ramp signal. The second leading-edge ramp signal is provided to the first comparator rather than the first. In this case, the pulse positioning circuit adaptively adjusts the second leading-edge ramp signal based on the load signal. In yet another embodiment, the pulse positioning circuit adjusts a slew rate of the leading-edge ramp signal based on the load signal. In a more specific slew-rate adjustment embodiment, the first ramp circuit includes a capacitor, a switch circuit which charges the capacitor to a maximum voltage level synchronous with a clock signal, and a controlled current sink which discharges the capacitor at a slew rate based on a current control signal. The pulse positioning circuit adjusts the current control signal based on the load signal.

A method of adaptively positioning PWM pulses that are used to control an output voltage of a voltage regulator according to an embodiment of the present invention includes generating a series of PWM pulses based on a clock signal, sensing an output load condition, and adaptively shifting the series of PWM pulses based on the output load condition.

The method may include sensing output load current. The method may include delaying a first clock signal to provide a delayed clock signal, generating a ramp signal based on the delayed clock signal, generating a compensation signal based on an error of the output voltage of the voltage regulator, comparing the ramp signal and the compensation signal and providing a control signal indicative thereof, asserting each PWM pulse based on the delayed clock signal and the control signal, and adaptively adjusting an amount of delay between the first clock signal and the delayed clock signal.

The method may include initiating the ramp signal with each pulse of the delayed clock signal, initiating each PWM pulse with a corresponding pulse of the delayed clock signal, and terminating each PWM pulse based on the control signal. The method may include generating a triangular waveform based on the delayed clock signal, asserting the control signal to a first level when the compensation signal is greater than the triangular waveform, asserting the control signal to a second level when the compensation signal is less than the triangular waveform, and transitioning each PWM pulse based on the control signal.

The method may include providing a leading-edge ramp signal synchronous with the clock signal, generating a first compensation signal based on an error of the output voltage of the voltage regulator, comparing the leading-edge ramp signal with a second compensation signal and providing a set signal indicative thereof, initiating a trailing-edge ramp signal when the set signal is provided, comparing the trailing-edge ramp signal with the first compensation signal and providing a reset signal indicative thereof, initiating each PWM pulse when the set signal is provided, terminating each PWM pulse when the reset signal is provided, generating an offset based on the output load condition, and adding the offset to the first compensation signal to provide the second compensation signal.

The method may include providing a first leading-edge ramp signal synchronous with the clock signal, generating a compensation signal based on an error of the output voltage of the voltage regulator, comparing a second leading-edge ramp signal with the compensation signal and providing a set signal indicative thereof, initiating a trailing-edge ramp signal when the set signal is provided, comparing the trailing-edge ramp signal with the compensation signal and providing a reset signal indicative thereof, initiating each PWM pulse when the set signal is provided, terminating each PWM pulse when the reset signal is provided, generating an offset based on the output load condition, and adding the offset to the first leading-edge ramp signal to provide the second leading-edge ramp signal.

The method may include providing a leading-edge ramp signal synchronous with the clock signal, generating a compensation signal based on an error of the output voltage of the voltage regulator, comparing the leading-edge ramp signal with the compensation signal and providing a set signal indicative thereof, initiating a trailing-edge ramp signal when the set signal is provided, comparing the trailing-edge ramp signal with the compensation signal and providing a reset signal indicative thereof, initiating each PWM pulse when the set signal is provided, terminating each PWM pulse when the reset signal is provided, and adjusting a slew rate of the leading-edge ramp signal based on the output load condition. In this slew-adjust case, the method may further include charging a capacitor to a predetermined level synchronous with the clock signal and discharging the capacitor at a rate based on the output load condition.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
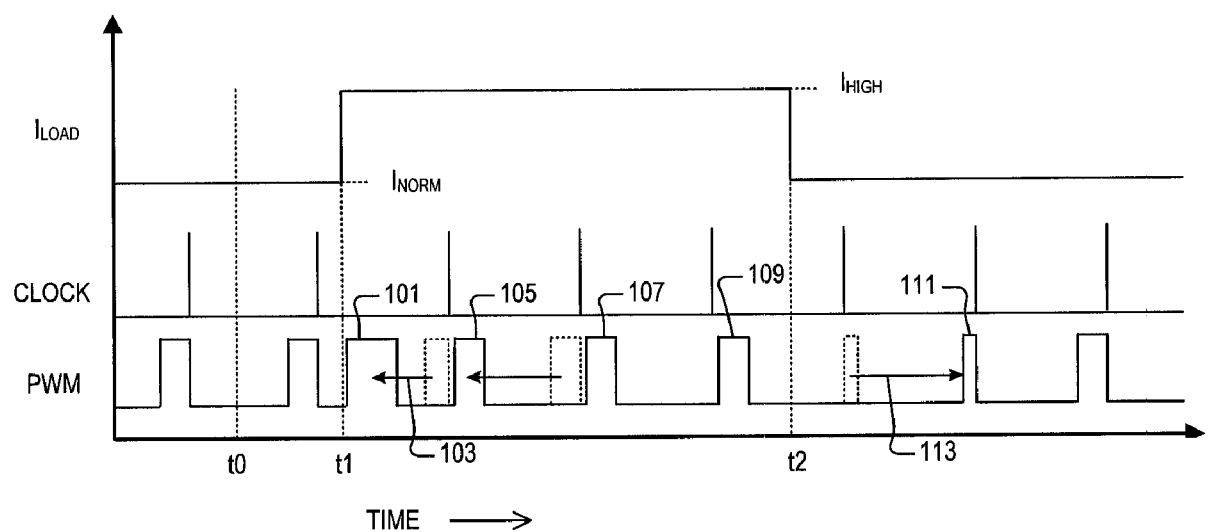
FIG. 1 is a timing diagram illustrating an operation mode of an adaptive PWM pulse positioning scheme according to an embodiment of the present invention.

FIG. 1 is a timing diagram illustrating an operation mode of an adaptive PWM pulse positioning scheme according to an embodiment of the present invention. In FIG. 1, an output load current $I_{LOAD}$ of a DC-DC power regulator (not shown) is plotted versus a clock signal and a PWM signal. At an initial time t0, the $I_{LOAD}$ signal is at a normal level $I_{NORM}$. The clock signal generates a periodic clock pulse according to a predetermined clock frequency. During normal operation under normal load as indicated by the $I_{NORM}$ level of the $I_{LOAD}$ signal, each PWM pulse begins during each clock cycle and is terminated by a pulse on the clock signal. At a subsequent time t1, an output transient occurs as indicated by the $I_{LOAD}$ signal jumping to a new high current level indicated as $I_{HIGH}$. In response to the output load transient, the next pulse 101 of the PWM signal is repositioned towards the beginning of the current clock cycle as indicated by arrow 103 relative to its normal position indicated with dotted lines. By moving the pulse 101 towards the beginning of the cycle after applying heavy load, the blank period after the transient event is naturally shortened, resulting in no extra voltage drop after the initial transient response. In this case, the pulse 101 also has a longer duration in response to the increase in the output load. The subsequent pulses 105, 107 and 109 of the PWM signal during the increased load event (while $I_{LOAD}$ is at $I_{HIGH}$) are shifted towards the beginning of respective clock cycles.

At subsequent time t2, the $I_{LOAD}$ signal returns to the normal level $I_{NORM}$. The next pulse 111 of the PWM signal is shifted back to the normal position at the end of the clock cycle as indicated by arrow 113. In certain modulation schemes as indicated in FIG. 1, the PWM pulse usually occurs at the end of the cycle. Under the transient event, the PWM pulse is pulled ahead in response to the output voltage drop. After the transient event, the PWM pulse goes back to its normal position (e.g., the end of the cycle). In order to avoid the extra voltage drop due to the blank period, the PWM pulse is moved towards the beginning of the cycle under the heavy load. The PWM pulse is at the end of the cycle under light load, therefore, and it moves according to the load condition such as towards the beginning of the cycle under full load condition. The PWM pulse position is flexible for better performance.

Rather than re-positioning the pulse, it is possible to allow a second PWM pulse in the same cycle, which causes the output to settle down sooner. A second pulse in the same cycle, however, tends to increase the switching frequency and thermal dissipation on the power stage if the transient event happens at a high repetitious rate. For fast transient response, it is desired that the PWM pulse be pulled ahead in one or more cycles. It is better to keep the PWM pulse near the end of the cycle under light load, so there is sufficient space to pull the pulse ahead in response to load transient events. The PWM pulse can be placed anywhere within a switching cycle under heavy load. For a load release event, the PWM ends soon after the transient and some blank time is necessary to discharge inductor current. So it is desirable to let the PWM pulse occur at the beginning of the cycle under heavy load condition. Therefore the PWM pulse is kept at the end of the cycle under light load condition, and moved to the beginning of the cycle when the load increases.

Figure 2:
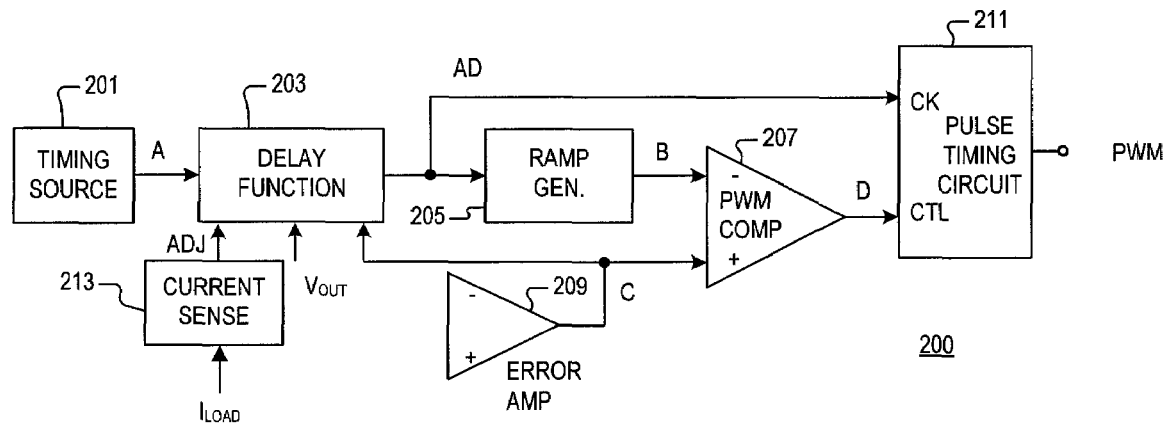
FIG. 2 is a simplified block diagram of a trailing edge modulator circuit implemented according to an embodiment of the present invention.

FIG. 2 is a simplified block diagram of a trailing edge modulator circuit 200 implemented according to an embodiment of the present invention. A timing source 201 generates a clock signal A which is provided to the input of a delay function 203. The delay function 203 delays the A signal and provides a delayed clock signal AD to the input of a ramp generator 205 and to a clock (CK) input of pulse timing circuit 211. In an alternative embodiment, the pulse timing circuit is replaced by an SR flip-flop. The ramp generator 205 generates a ramp signal B, which is provided to one input (e.g., inverting input) of a PWM comparator 207. An error amplifier 209 provides a compensation signal C to the other input (e.g., non-inverting input) of the comparator 207. The comparator 207 generates a signal D, which is provided to a control (CTL) input of the pulse timing circuit 211. The pulse timing circuit 211 generates a PWM signal based on the D signal used to control the output voltage of the DC-DC power regulator, and is configured to ensure only one pulse per cycle of the AD signal. A current sense block 213 provides an adjust signal ADJ to another input of the delay function 203. The current sense block 213 senses output current, such as the load current $I_{LOAD}$ through an output load (as shown) and controls the ADJ signal accordingly. The C signal and the output voltage of the converter VOUT are also shown provided to the delay function 203. The amount of delay between the signals A and AD, or $T_{DELAY}$, is a function of ADJ, $V_{OUT}$ and C, or $T_{DELAY}=TD1+f1*ADJ+f2*C+f3*V_{OUT}$, where TD1 is a constant, and the functions f1, f2 and f3 are any suitable functions that range from relatively simple to as complex as desired. In one embodiment, f1-f3 are constants.

In an alternative embodiment, the current sense block 213 senses current through an output inductor of the regulator, or senses the phase current of each of one or more output phase circuits.

Figure 3:
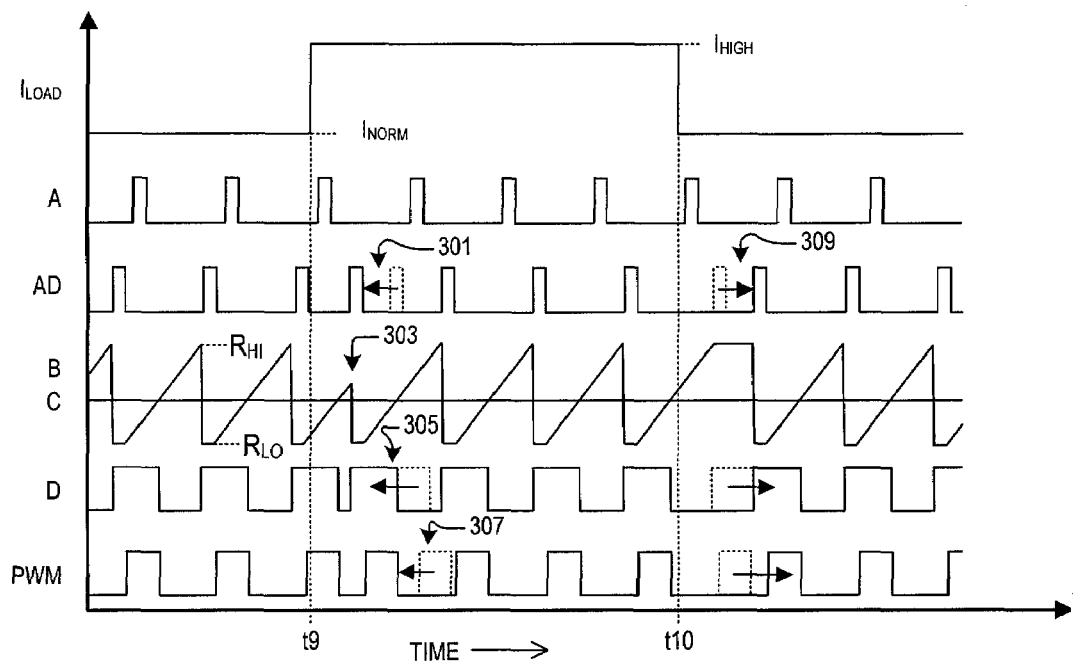
FIG. 3 is a timing diagram illustrating operation of the trailing edge modulator circuit of FIG. 2.

FIG. 3 is a timing diagram illustrating operation of the trailing edge modulator circuit 200. The signals $I_{LOAD}$, A, AD, B, C, D, and PWM are plotted versus time. The B and C signals are superimposed with each other to more clearly illustrate the function of the comparator 207. In the illustrated embodiment, the ramp generator 205 generates the B signal as a sawtooth waveform with rising ramps. Thus, the ramp signal B begins at a low ramp level $R_{LO}$ when the AD signal pulses high and rises at a constant rate when the AD pulse goes back low. The ramp signal B is constrained to a predetermined high level $R_{HI}$ in the illustrated embodiment. The compensation signal C is configured to range between $R_{LO}$ and $R_{HI}$. In operation, the B ramp signal resets back to $R_{LO}$ upon the initial edge of the AD clock signal and ramps up beginning with the trailing edge of the AD clock signal. The comparator 207 asserts the D signal high while B is lower than C, and otherwise asserts the D signal low. The pulse timing circuit 211 generally asserts the PWM signal coincident with the D signal except beginning after the AD signal goes low in each cycle, so that PWM goes high when AD goes low and goes low when D goes low. Operation repeats in this manner and the duration of each PWM pulse depends in part on the level of the compensation signal C.

In a conventional trailing edge modulator circuit (not shown), the delay function 203 is not present so that timing is based on the A clock signal rather than the AD clock signal. The delay function 203 enables the timing of the AD clock signal to be adjusted based on the ADJ signal from the current sense block 213, which modifies the ADJ signal based on the level of the $I_{LOAD}$ signal (or other sensed output current). At a time t9, the $I_{LOAD}$ signal jumps from $I_{NORM}$ to $I_{HIGH}$ as previously described. In response, the current sense block 213 modifies the ADJ signal to decrease the delay of the AD signal relative to the clock signal A. As shown at 301, the next pulse on the AD signal is shifted or re-positioned to earlier in the cycle. The early initial edge of the AD pulse causes the ramp signal B to reset back to $R_{LO}$ earlier than normal as shown at 303. The early reset of the ramp signal B causes the D signal to shift position to earlier in the cycle as shown at 305. The early pulse on the D signal causes the PWM signal to be shifted to be asserted earlier in the cycle as shown at 307. After the load transient shift event, timing of the pulses are effectively the same except that they are shifted relative to the normally condition. The relative widths of the PWM pulses may adjust to handle the additional load. In this manner, the PWM signal is repositioned to earlier in the cycle in response to the load transient event. The PWM signal remains shifted as long as the load transient condition exists, and returns to normal when the higher load condition is removed. As shown at time t10, the $I_{LOAD}$ signal returns to $I_{NORM}$, and the next AD pulse shifts to later in the cycle as shown at 309. This causes the D and the PWM pulses to shift back to their normal positions. In this manner, the positions of the PWM pulses are adjusted or adapted in response to the load transient to provide better performance.

The delay function 203 does not increase the frequency of the clock signal but instead simply enables a temporary adjustment of the positioning of the PWM pulses. It is noted that the delay during normal conditions may be made as long as desired, such as one period of the A signal. If the delay is about equal to the clock period, then the PWM pulse may be repositioned to almost anywhere within a given cycle to properly respond to an asynchronous load transient event.

Figure 4:
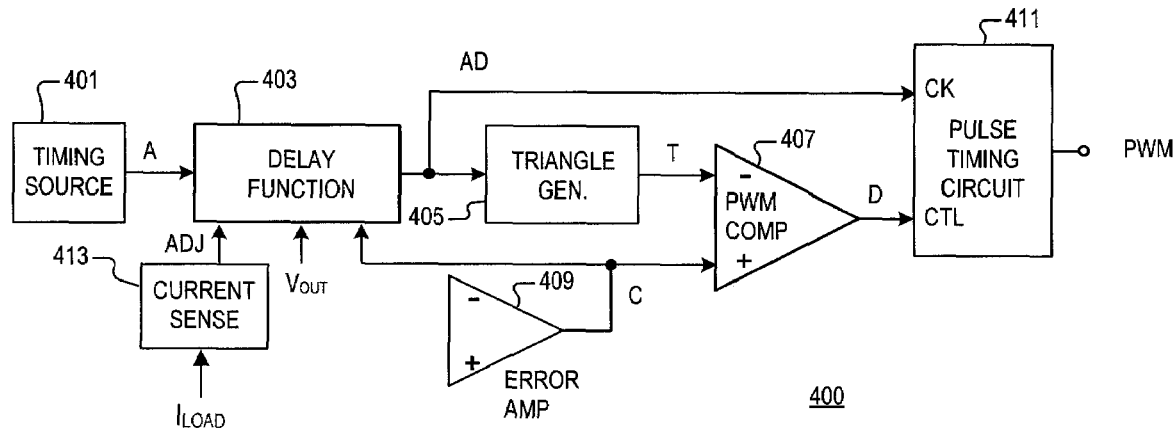
FIG. 4 is a simplified block diagram of a dual edge modulator circuit implemented according to an embodiment of the present invention.

FIG. 4 is a simplified block diagram of a dual edge modulator circuit 400 implemented according to an embodiment of the present invention. In a similar manner as with the trailing edge modulator circuit 200, a timing source 401 generates a clock signal A which is provided to the input of a delay function 403. The delay function may operate in substantially the same manner as the delay function 205. The delay function 403 delays the A signal and provides a delayed clock signal AD to the input of a triangle ramp generator 405 and to a clock (CK) input of pulse timing circuit 411. The triangle ramp generator 405 generates a triangle ramp signal T, which is provided to one input (e.g., inverting input) of a comparator 407. An error amplifier 409 provides a compensation signal C to the other input (e.g., non-inverting input) of the comparator 407 and to the delay function 403. The comparator 407 generates a signal D, which is provided to a control input of the pulse timing circuit 411. The pulse timing circuit 411 generates a PWM signal based on the D signal used to control the output voltage, and is configured to ensure only one pulse per clock cycle. A current sense circuit 413 receives the $I_{LOAD}$ signal and provides an adjust signal ADJ to another input of the delay function 403, which also receives the $V_{OUT}$ signal as shown. The current sense circuit 413 senses output current, such as the load current through an output load or the current through an output inductor or the phase current of each of one or more output phase circuits, and controls the ADJ signal accordingly as previously described. The $V_{OUT}$ signal is also shown provided to the delay function 403. The amount of delay provided by the delay function 403 is substantially similar to the delay function 203, or $T_{DELAY}=TD1+f1*ADJ+f2*C+f3*V_{OUT}$.

Figure 5:
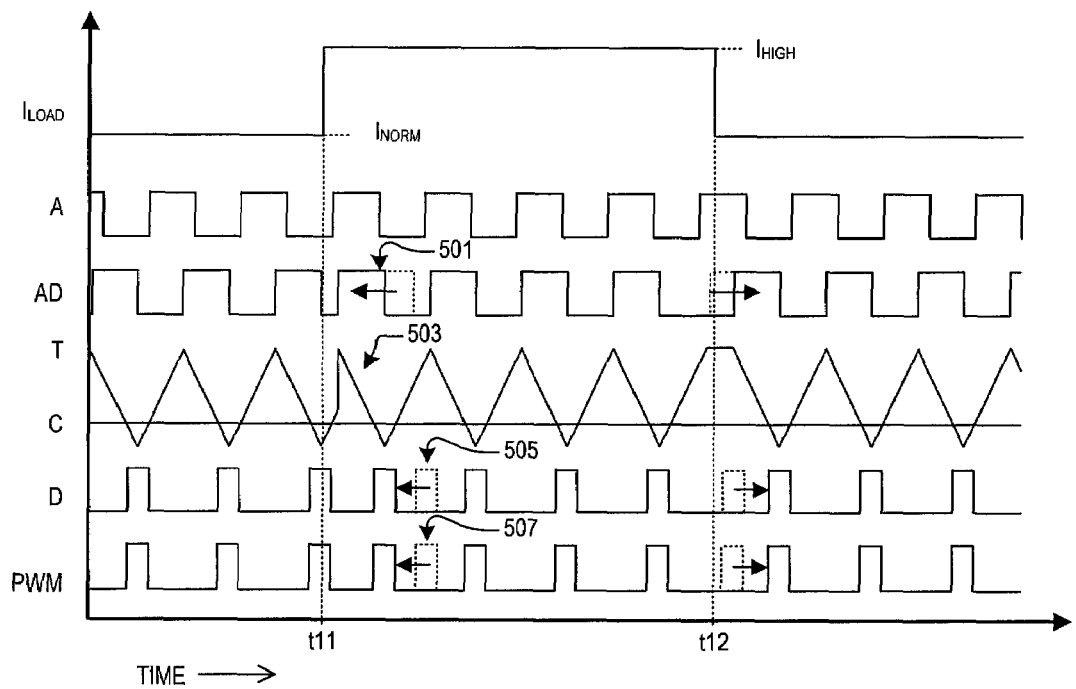
FIG. 5 is a timing diagram illustrating operation of the dual edge modulator circuit of FIG. 4.

FIG. 5 is a timing diagram illustrating operation of the dual edge modulator circuit 400. The signals $I_{LOAD}$, A, AD, T, C, D, and PWM are plotted versus time. The T and C signals are superimposed with each other to more clearly illustrate the function of the comparator 407. In this case, the clock signals A and AD are 50% duty cycle signals. The triangle ramp signal T ramps up while the AD signal is low and ramps down while the AD signal is high. In operation, the D signal is asserted high when the T signal is less than the C signal but is otherwise asserted low. The PWM signal is asserted by the pulse timing circuit 411 while the D signal is high. Operation repeats in this manner and the duration of each PWM pulse depends in part on the level of the compensation signal C.

In a conventional dual edge modulator circuit (not shown), the delay function 403 is not present so that timing is based on the A clock signal rather than the AD clock signal. For the dual edge modulator circuit 400, the delay function 403 enables the timing of the AD clock signal to be adjusted based on the ADJ signal from the current sense block 413, which modifies the ADJ signal based on the level of the $I_{LOAD}$ signal. At a time t11, the $I_{LOAD}$ signal jumps from $I_{NORM}$ to $I_{HIGH}$ as previously described. The current sense block 413 modifies the ADJ signal in response to decrease the delay of the AD signal relative to the clock signal A. As shown at 501, the AD signal is shifted earlier in the cycle because of the reduced delay. The triangular ramp signal T ramps down earlier (as compared to normal conditions) to intersect the C signal earlier in the clock cycle as shown at 503. The early intersection between the T and C signals causes the D signal to be shifted to be asserted earlier in the cycle as shown at 505, which thus causes the PWM signal to be re-positioned to earlier in the cycle as shown at 507. The adaptive positioning results in the PWM signal being repositioned to earlier in the cycle in response to the load transient event. The PWM pulses remain shifted as long as the load transient condition exists, and return to normal positions when the load condition is removed. As shown as subsequent time t12, the $I_{LOAD}$ signal returns to $I_{NORM}$, causing the AD, D and PWM signals to shift back to their normal positions. In this manner, the position of the PWM pulse is adjusted or adapted and thus flexible for better performance.

A dual-edge modulation scheme using dual ramps was disclosed in U.S. patent application Ser. No. 11/318,081 entitled "PWM controller with dual-edge modulation using dual ramps" filed Dec. 23, 2005, which is herein incorporated by reference for all intents and purposes. The dual-ramp, dual-edge modulation scheme also limits the PWM pulses to one per clock cycle. Due to one pulse per cycle limit, there may exist a period without any PWM pulse after an initial response to a heavy load transient event. This blank period may result in extra voltage drop after the transient event. In one dual-ramp dual-edge modulation scheme, the PWM pulse always happens at the end of the cycle. Under the transient event, the PWM pulse may be pulled ahead in response to the output voltage drop. After the transient event, the PWM pulse goes back to the end of the cycle. In order to avoid the extra voltage drop due to the blank period, the PWM pulse can be moved to the beginning of the cycle under the heavy load. Therefore the PWM pulse is at the end of the cycle under light load, and it moves according to the load condition, and at the beginning of the cycle under full load condition. The PWM pulse position is flexible for better performance.

Figure 6:
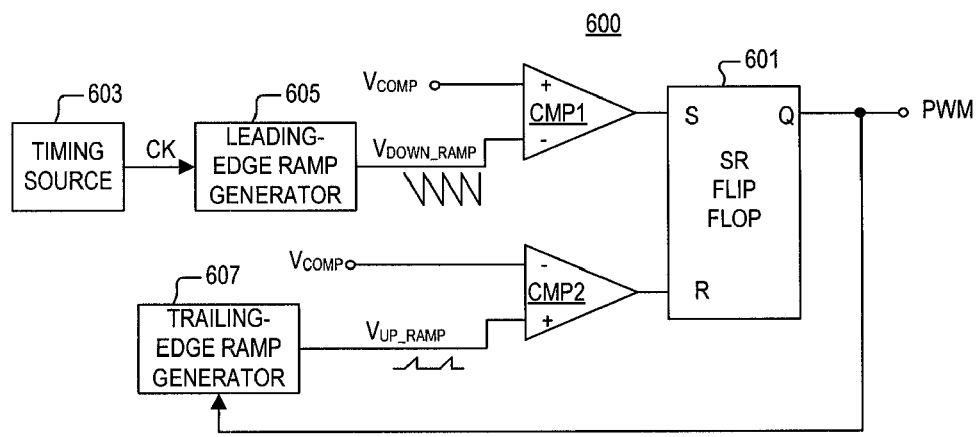
FIG. 6 is a schematic diagram of a dual-ramp dual-edge PWM modulation circuit according to an embodiment described in a previously filed patent application.

FIG. 6 is a schematic diagram of a dual-ramp dual-edge PWM modulation circuit 600 according to an embodiment described in the above-referenced patent application. A down ramp comparator CMP1 has a non-inverting input receiving a compensation signal $V_{COMP}$ (such as from an error amplifier, e.g., 209, 409), an inverting input receiving a down ramp signal $V_{DOWN\_RAMP}$, and an output coupled to the set input of a set-reset (SR) flip-flop 601. An up ramp comparator CMP2 has an inverting input receiving the $V_{COMP}$ signal, a non-inverting input receiving an up ramp signal $V_{UP\_RAMP}$, and an output coupled to the reset input of the SR flip-flop 601. The Q output of the SR flip-flop 601 asserts the PWM signal providing PWM pulses. A timing source 603 generates a clock signal CK, which is provided to a leading-edge ramp generator 605. In the embodiment shown, the leading-edge ramp generator 605 generates the down ramp sawtooth waveform, shown as $V_{DOWN\_RAMP}$, synchronous with the CK signal. When the down ramp signal falls to the level of $V_{COMP}$, the comparator CMP1 asserts its output high and sets the SR flip-flop 601, which asserts the PWM signal high to initiate each PWM pulse. A trailing-edge ramp generator 607 generates a trailing-edge ramp signal for purposes of terminating each PWM pulse, which is shown as the up ramp signal $V_{UP\_RAMP}$. When the PWM signal is asserted high, the trailing-edge ramp generator 607 begins ramping up the $V_{UP\_RAMP}$ signal (see, e.g., operation of the $V_{UP\_RAMP}$ signal shown in FIG. 16). When $V_{UP\_RAMP}$ reaches $V_{COMP}$, the comparator CMP2 asserts its output high, resetting the SR flip-flop 601, and pulling the PWM signal low thereby terminating each PWM pulse. When PWM is pulled low, the trailing-edge ramp generator 607 pulls the $V_{UP\_RAMP}$ signal back low again.

The dual-ramp dual-edge PWM modulation circuit 600 turns on and off the PWM pulse at any time within one switching cycle, so its transient response is very quick. Under normal operation, the PWM pulse occurs at the end of the switching cycle. When the heavy load is applied at the beginning of the cycle, the PWM pulse is pulled ahead to the beginning of the switching cycle to try to keep the output within the specifications. In order to limit the switching frequency, typically only one PWM pulse is allowed in one switching cycle. If the heavy transient load event and PWM pulse happens at the beginning of the cycle, another PWM pulse does not occur until next cycle. There may exist a long period in which a PWM pulse does not occur, resulting in extra voltage drop after the initial response.

Figure 7:
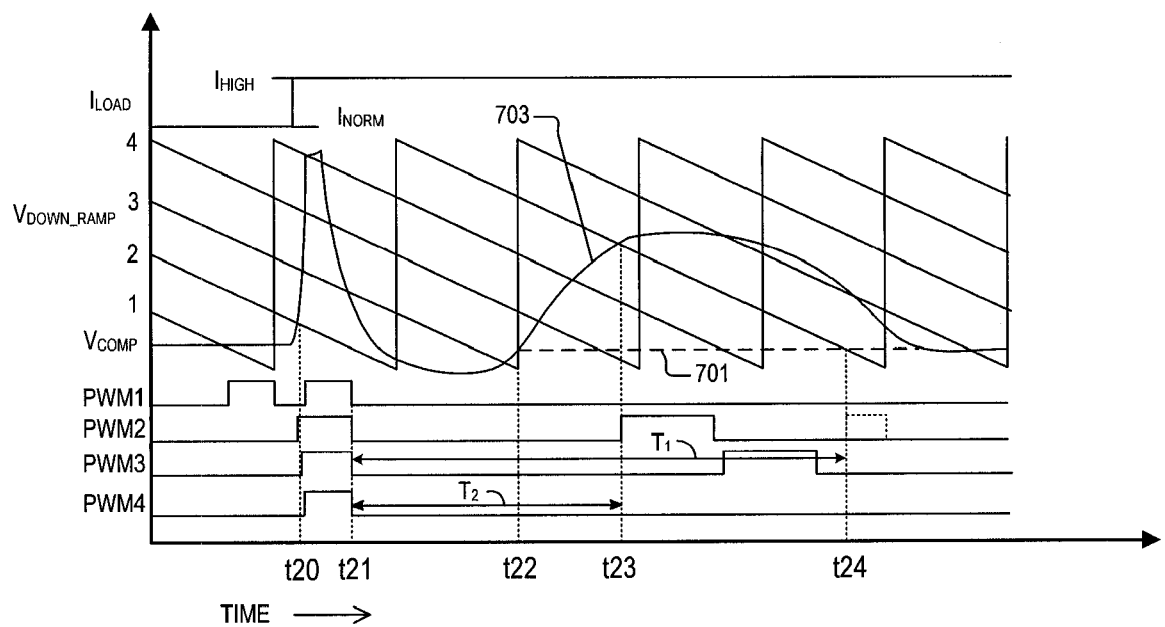
FIG. 7 is a timing diagram illustrating operation of the dual-ramp dual-edge PWM modulation circuit of FIG. 6 illustrating the long blank period issue in the dual-ramp dual-edge modulation scheme for a 4-phase system.

FIG. 7 is a timing diagram illustrating operation of the dual-ramp dual-edge PWM modulation circuit 600 illustrating the long blank period issue in the dual-ramp dual-edge modulation scheme for a 4-phase system. Signals $I_{LOAD}$, four $V_{DOWN\_RAMP}$ signals 1-4 (one for each phase, or $V_{DOWN\_RAMP1}$-$V_{DOWN\_RAMP4}$), the voltage of the compensation signal ($V_{COMP}$) and corresponding four PWM signals PWM1, PWM2, PWM3 and PWM4 are plotted versus time. At about a time t20, a heavy load is applied to the system and the control loop quickly turns on all phases responding to this event as illustrated by simultaneous pulses on each PWM signal. At subsequent time t21, all phases are turned off. At subsequent time t22, the control voltage, $V_{COMP}$, returns to its operational point. In the ideal case, if the system is stable after this time, the control voltage is expected to be constant as indicated by a dashed line 701. Due to the one-pulse-per-cycle limitation, however, there is not another PWM pulse until a time t24. In the ideal case, therefore, there exists a "blank" period $T_1$ between times t21 and t24, which is about equal to the switching period. In an actual case, since no PWM pulse occurs in the blank period, the output voltage drops until next PWM pulse. Therefore the actual compensation voltage $V_{COMP}$ increases as shown at 703 attempting to maintain the output voltage within the specifications. So, there is a PWM pulse earlier in the cycle at a time t23 so that the actual blank period $T_2$ between times t21 and t23 is much less than the switching period. Even though the blank period $T_2$ is less than one switching cycle, it causes the extra voltage drop, and the output voltage may oscillate several cycles before it settles down.

Therefore, in the illustrated dual edge scheme, there may exist a blank period after the initial transient response in the dual-ramp dual-edge modulation scheme, which results in the extra voltage drop and possible oscillation issue. In order to avoid the extra voltage drop, the blank period should be as short as possible. One way to solve the issue is to allow a second pulse in the same cycle under the heavy transient event. As shown in FIG. 7, $V_{COMP}$ goes up again after the initial transient response. If the second PWM pulse is allowed in the same cycle, the output settles down soon. But it may increase the switching frequency and thermal dissipation on the power stage if the transient event happens at a high repetitious rate. For fast transient response, the PWM pulse should be able to be pulled ahead in one cycle. It is better to keep the PWM pulse at the end of the cycle under light load, so there is space to pull the pulse ahead. However, the PWM pulse can be placed anywhere within a switching cycle under heavy load. For a load release event, the PWM ends soon after the transient and some blank time is necessary to discharge the inductor current. So it is desirable to let the PWM pulse occur at the beginning of the cycle under heavy load condition. As described further below, the PWM pulse is kept at the end of the cycle under light load condition, and is moved to the beginning of the cycle when the load increases.

Figure 8:
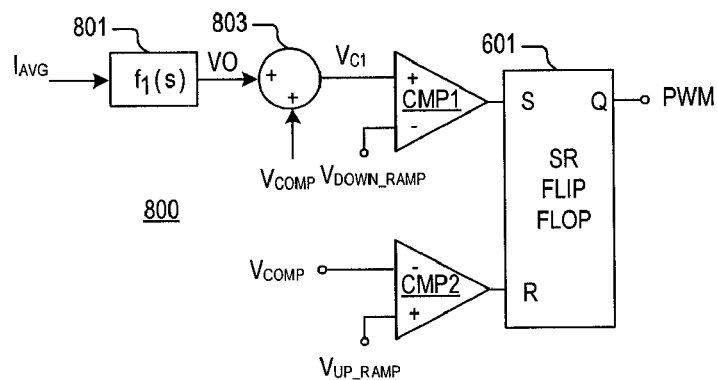
FIG. 8 is a block diagram illustrating an adaptive PWM pulse positioning system according to one embodiment of the present invention applicable to dual-ramp dual-edge PWM modulation circuits.

FIG. 8 is a block diagram illustrating an adaptive PWM pulse positioning system 800 according to one embodiment of the present invention applicable to dual-ramp dual-edge PWM modulation circuits. Similar components as those of the dual-ramp dual-edge PWM modulation circuit 600 assume identical reference characters. The timing source 603 and the generators 605 and 607 are not shown but are provided and operate in the same manner. The up ramp comparator CMP2 receives the $V_{COMP}$ and $V_{UP\_RAMP}$ signals and has its output coupled to the reset input of the SR flip-flop 601. The inverting input of the down ramp comparator CMP1 receives the down ramp signal $V_{DOWN\_RAMP}$ and its output is coupled to the set input of the SR flip-flop 601. In this case, an offset voltage VO is added to the error amplifier output signal $V_{COMP}$ using a function block 801 and an adder 803, which provides an adjusted compensation signal $V_{C1}$ to the non-inverting input of the comparator CMP1. The output of the comparator CMP1 is coupled to the set input of the SR flip-flop 601. The offset voltage VO is a function $f_1(s)$ of the sensed average current $I_{AVG}$ of all phases, such that $VO=f_1(s)*I_{AVG}$ in which an asterisk "*" denotes multiplication. Under heavy load, the offset voltage VO is high to trigger the PWM pulse early in the cycle. Although not shown, a balance current may be used to adjust the compensation signal provided to the up ramp comparator CMP2, in which the balance current is related to a sensed phase current of one phase $I_{phase}$ and the sensed average current $I_{AVG}$ of all phases, e.g., $f_2(I_{AVG}, I_{phase})$ where $f_2$ is any suitable function. A simple example is $I_{balance}=k*(I_{AVG}-I_{phase})$, where k is a constant.

Figure 9:
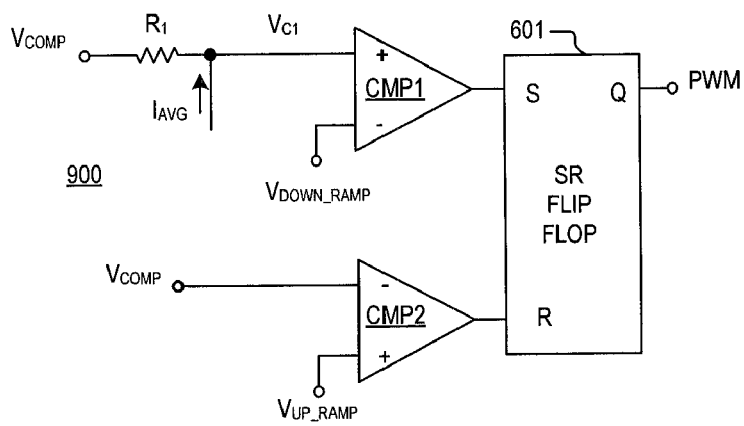
FIG. 9 is a schematic diagram of a PWM pulse positioning system implementing an exemplary embodiment of the adaptive PWM pulse positioning system of FIG. 8.

FIG. 9 is a schematic diagram of a PWM pulse positioning system 900 implementing an exemplary embodiment of the adaptive PWM pulse positioning system 800. Similar components as those of the dual-ramp dual-edge PWM modulation circuit 800 assume identical reference characters. The timing source 603 and the generators 605 and 607 are not shown but are provided and operate in the same manner. In this case, the $V_{COMP}$ signal is provided to one end of a resistor $R_1$, having its other end developing the $V_{C1}$ signal provided to the non-inverting input of the comparator CMP1. The $I_{AVG}$ current is injected into the node developing the $V_{C1}$ signal, so that $VO=R_1*I_{AVG}$ and $V_{C1}=V_{COMP}+R_1*I_{AVG}$.

Figure 10:
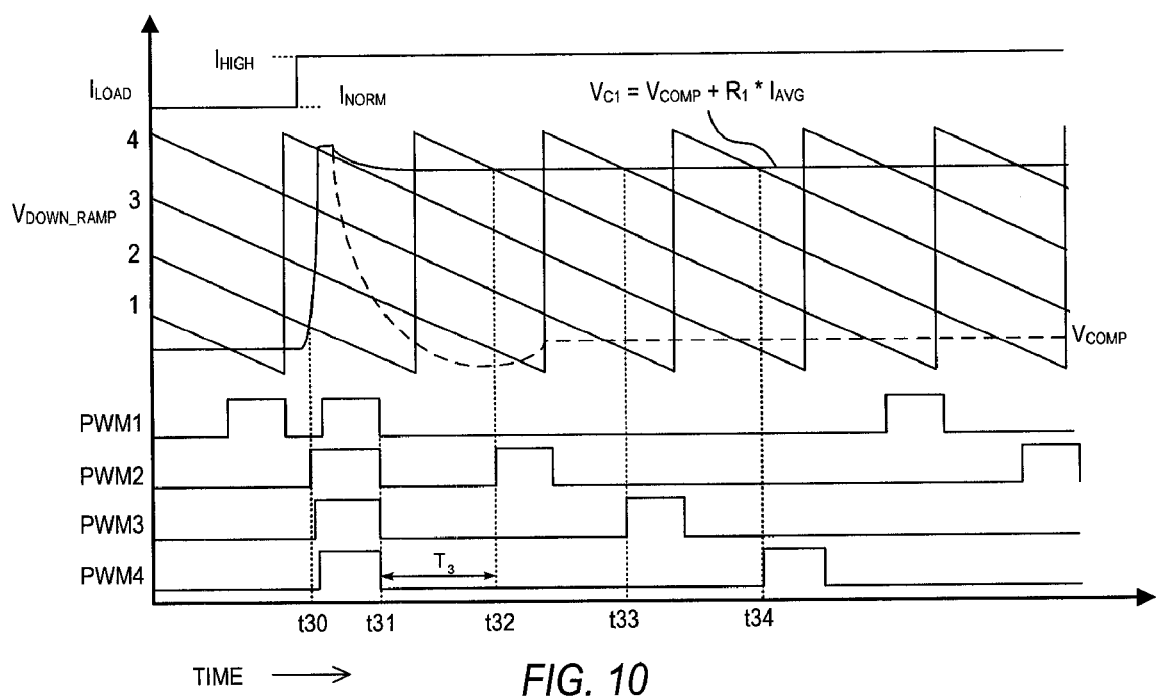
FIG. 10 is a timing diagram illustrating operation of the adaptive PWM pulse positioning system of FIG. 9 for a four phase system.

FIG. 10 is a timing diagram illustrating operation of the adaptive PWM pulse positioning system 900 for a four phase system, which includes four down ramp signals $V_{DOWN\_RAMP1}$-$V_{DOWN\_RAMP4}$ and four PWM signals PWM1-PWM4. The signals $I_{LOAD}$, $V_{C1}$, $V_{DOWN\_RAMP1}$-$V_{DOWN\_RAMP4}$, and PWM1-PWM4 are plotted versus time. The $V_{C1}$ signal is superimposed with the $V_{DOWN\_RAMP1}$-$V_{DOWN\_RAMP4}$ signals to illustrate operation of respective comparators for developing the PWM1-PWM4 signals. The voltage of $V_{COMP}$ is shown with dashed lines for purposes of comparison. As shown, a load transient occurs just before a time t30, causing triggering of all of the PWM1-PWM4 signals, which go low again at about time t31. Additional PWM pulses occur on the PWM2, PWM3 and PWM4 signals at times t32, t33 and t34, respectively, each significantly earlier than would otherwise occur if the $V_{COMP}$ signal was provided directly to the comparator CMP1 rather than the modified compensation signal $V_{C1}$. In this manner, performance is significantly improved.

Figure 11:
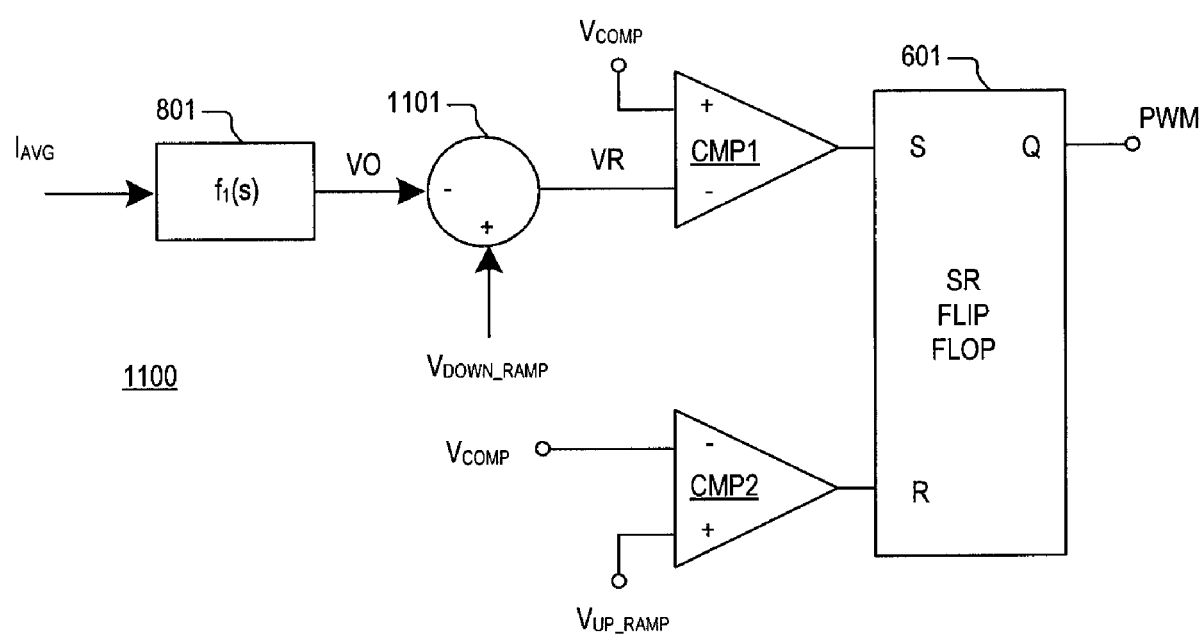
FIG. 11 is a block diagram illustrating an adaptive PWM pulse positioning system according to another embodiment of the present invention applicable to dual-ramp dual-edge PWM modulation circuits.

FIG. 11 is a block diagram illustrating an adaptive PWM pulse positioning system 1100 according to another embodiment of the present invention applicable to dual-ramp dual-edge PWM modulation circuits. The adaptive PWM pulse positioning system 1100 is similar to the adaptive PWM pulse positioning system 800, in which similar components assume identical reference characters. The timing source 603 and the generators 605 and 607 are not shown but are provided and operate in the same manner. The $I_{AVG}$ signal is provided to the function block 801 for developing the offset voltage VO, which is provided to the inverting input of an adder 1101. The adder 1101 receives the $V_{DOWN\_RAMP}$ signal at its non-inverting input. In this case, the $V_{DOWN\_RAMP}$ signal is adjusted by the offset voltage VO rather than the error amplifier output signal $V_{COMP}$. The adder 1101 subtracts VO from $V_{DOWN\_RAMP}$ to develop an adjusted ramp signal VR, which is provided to the inverting input of the comparator CMP1. As shown, the error amplifier output signal $V_{COMP}$ is provided directly to the inverting input of the comparator CMP2, which receives the $V_{UP\_RAMP}$ at its non-inverting input and which has its output coupled to the reset input of the SR flip-flop 601. The SR flip-flop 601 operates in similar manner to provide the PWM signal.

Figure 12:
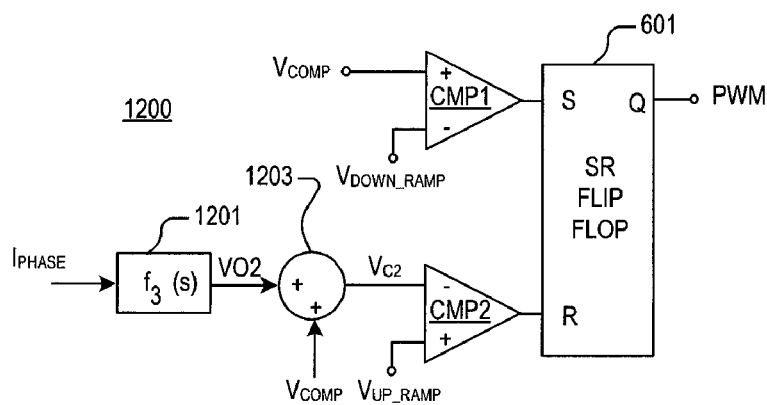
FIG. 12 is a block diagram illustrating an adaptive PWM pulse positioning system according to another embodiment of the present invention applicable to dual-ramp dual-edge PWM modulation circuits.

FIG. 12 is a block diagram illustrating an adaptive PWM pulse positioning system 1200 according to another embodiment of the present invention applicable to dual-ramp dual-edge PWM modulation circuits. The adaptive PWM pulse positioning system 1200 is similar to the dual-ramp dual-edge PWM modulation circuit 600 in which similar components assume identical reference characters. The timing source 603 and the generators 605 and 607 are not shown but are provided and operate in the same manner. The comparator CMP1 is provided and compares the $V_{COMP}$ and $V_{DOWN\_RAMP}$ signals and provides its output to the set input of the SR Flip-Flop 600 providing the PWM signal at its Q output. In this case, a different offset voltage VO2 is developed which is related to the sensed phase current $I_{PHASE}$ of the respective phase of a multiphase converter. The current $I_{PHASE}$ is provided to the input of a function block 1201 (multiplying $I_{PHASE}$ by a function f3(s)) to develop VO2, which is then provided to an input of an adder 1203. The adder 1203 adds $V_{COMP}$ to VO2 develop an adjusted compensation signal VC2. The VC2 signal is provided to the inverting input of the comparator CMP2, which receives $V_{UP\_RAMP}$ at its non-inverting input and which has its output coupled to the reset input of the SR flip-flop 601. Under heavy load, the offset voltage VO2 is high, and the $V_{C2}$ voltage increases to keep the same duty cycle, resulting in early triggering of the PWM pulse for each phase.

Figure 13:
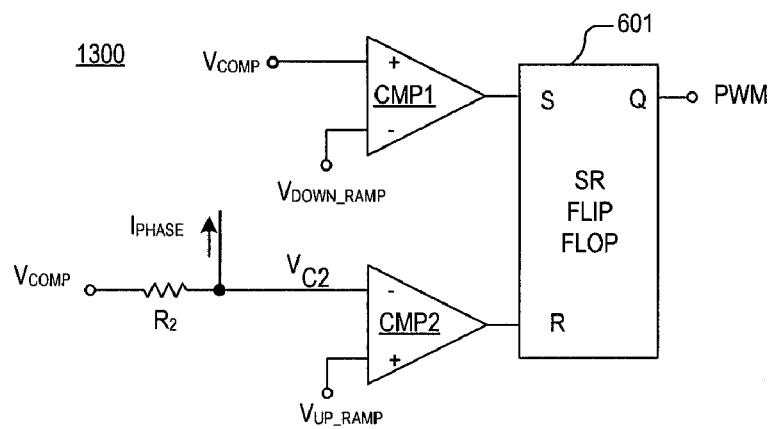
FIG. 13 is a schematic diagram of an adaptive PWM pulse positioning system implementing an exemplary embodiment of the adaptive PWM pulse positioning system of FIG. 12.

FIG. 13 is a schematic diagram of an adaptive PWM pulse positioning system 1300 implementing an exemplary embodiment of the adaptive PWM pulse positioning system 1200. Again, similar components assume identical reference characters. The timing source 603 and the generators 605 and 607 are not shown but are provided and operate in the same manner. In this case, the function block 1201 and the adder 1203 are effectively replaced with a resistor $R_2$, having one end receiving the $V_{COMP}$ signal and another end developing the $V_{C2}$ signal, which is provided to the inverting input of the comparator CMP2 as shown. The $I_{PHASE}$ current is pulled from the node developing the $V_{C2}$ signal, such that $V_{C2}=V_{COMP}-R_2*I_{PHASE}$. The adjusted compensation signal $V_{C2}$ is compared with the $V_{UP\_RAMP}$ signal by the comparator CMP2, which has its output coupled to the reset input of the SR flip-flop 601. The circuit of the comparator CMP1 is the same as that shown in FIG. 12.

Figure 14:
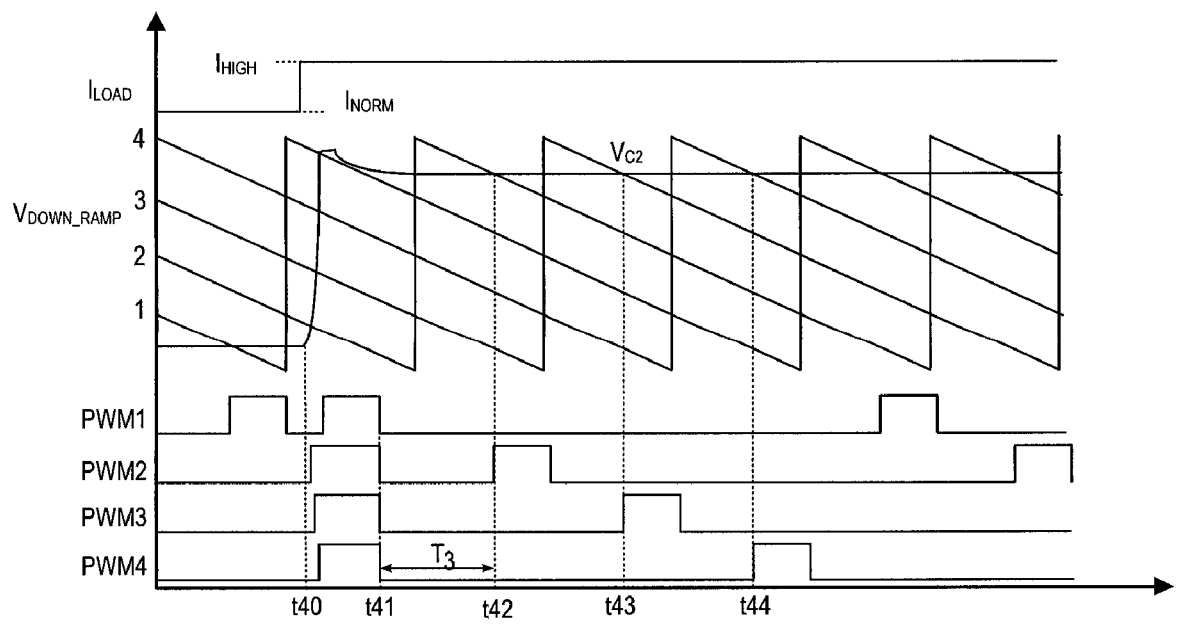
FIG. 14 is a timing diagram illustrating operation of the adaptive PWM pulse positioning system of FIG. 13 for a four phase system.

FIG. 14 is a timing diagram illustrating operation of the adaptive PWM pulse positioning system 1300 for a four phase system, which includes four down ramp signals $V_{DOWN\_RAMP1}$-$V_{DOWN\_RAMP4}$ and four PWM signals PWM1-PWM4. The signals $I_{LOAD}$, $V_{C2}$, $V_{DOWN\_RAMP1}$-$V_{DOWN\_RAMP4}$, AND PWM1-PWM4 ARE PLOTTED VERSUS TIME. THE $V_{C2}$ signal is superimposed with the $V_{DOWN\_RAMP1}$-$V_{DOWN\_RAMP4}$ signals to illustrate operation of respective comparators for developing the PWM1-PWM4 signals. As shown, a load transient occurs about a time t40, causing triggering of all of the PWM1-PWM4 signals, which go low again at a subsequent time t41. Additional PWM pulses occur on the PWM2, PWM3 and PWM4 signals at times t42, t43 and t44, respectively, each significantly earlier than would otherwise occur if the $V_{COMP}$ signal was provided directly to the comparator CMP2 rather than the modified compensation signal $V_{C2}$. In this manner, performance is significantly improved.

Figure 15:
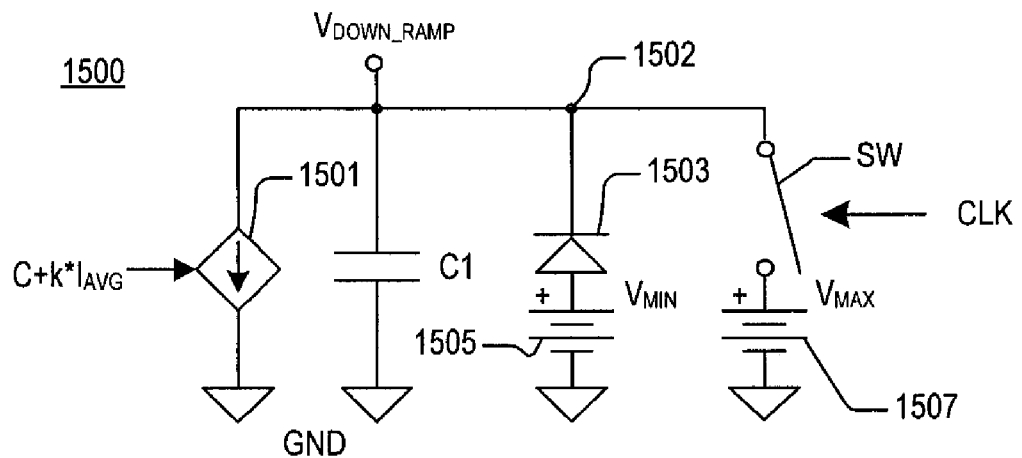
FIG. 15 is a block diagram of a down ramp generator which may be used to develop the down ramp signal of the dual-ramp dual-edge PWM modulation circuit of FIG. 6, thus illustrating an adaptive PWM pulse positioning system according to another embodiment of the present invention.

FIG. 15 is a block diagram of a down ramp generator 1500 which may be used to develop the $V_{DOWN\_RAMP}$ signal of the dual-ramp dual-edge PWM modulation circuit 600, thus illustrating an adaptive PWM pulse positioning system according to another embodiment of the present invention. Thus, the dual-ramp dual-edge PWM modulation circuit 600 is used except that the leading-edge ramp generator 605 is replaced with the down ramp generator 1500. And for the down ramp generator 1500, a controlled current sink 1501 is coupled between ground (GND) and a node 1502 developing the $V_{DOWN\_RAMP}$ signal. A capacitor C1 is coupled between node 1502 and GND. A diode 1503 has its cathode coupled to node 1502 and its anode coupled to the positive terminal of a voltage source 1505 developing a minimum ramp voltage $V_{MIN}$. A single-pole, single-throw (SPST) switch SW has its switched terminals coupled between node 1502 and the positive terminal of a voltage source 1507 developing a maximum ramp voltage $V_{MAX}$, where $V_{MAX}$ is greater than $V_{MIN}$. The negative terminals of the voltage sources 1505 and 1507 are coupled to GND. The switch SW has a control terminal receiving the clock signal (CLK), which opens and closes the SW at the frequency of the CLK signal. The current sink 1501 has a control terminal receiving a signal $C+k*I_{AVG}$, in which C and k are constants. In this manner, the current of the current sink 1501 is based on the measured or sensed level of $I_{AVG}$.

In operation of the down ramp generator 1500, the switch SW closes and the voltage source 1507 charges the capacitor C1 to the voltage level $V_{MAX}$. When the switch SW is opened, the current sink 1501 discharges the capacitor C1 at a rate based on the $I_{AVG}$ signal. The constants C and k are determined to provide a suitable slew rate of the $V_{DOWN\_RAMP}$ signal for a normal operating level of the $I_{AVG}$ signal. When the $I_{AVG}$ signal is increased due to a load transition, the slew rate of the $V_{DOWN\_RAMP}$ signal is increase accordingly to accelerate discharge of the capacitor C1 and thus re-position the next PWM pulse earlier in the cycle. Consequently, the slew rate of the $V_{DOWN\_RAMP}$ signal is adjusted based on the sensed average current $I_{AVG}$. Under light load, $I_{AVG}$ is lower and the slew rate of the $V_{DOWN\_RAMP}$ signal is low. Under heavy load, $I_{AVG}$ is increased and the slew rate of the $V_{DOWN\_RAMP}$ signal is increased, resulting in early triggering of the PWM pulse in the cycle.

Figure 16:
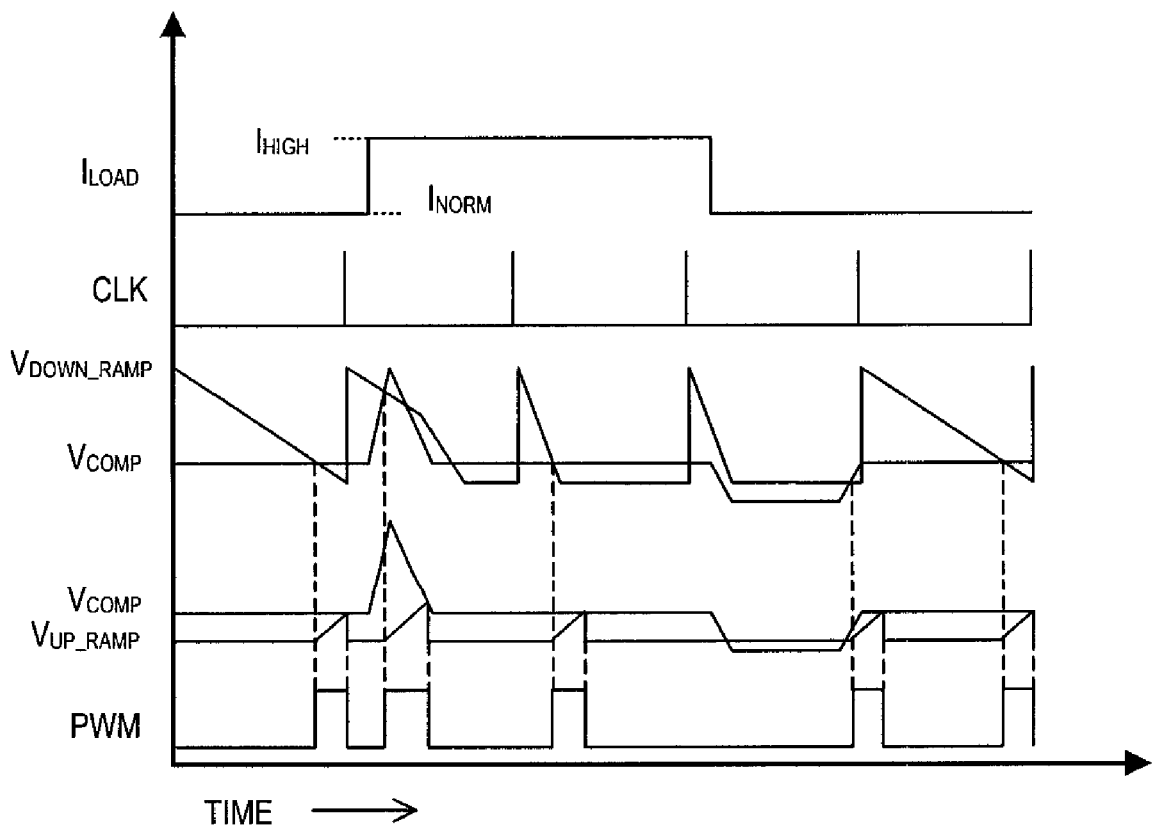
FIG. 16 is a timing diagram illustrating operation of an adaptive PWM pulse positioning system employing the down ramp generator of FIG. 15.

FIG. 16 is a timing diagram illustrating operation of an adaptive PWM pulse positioning system employing the down ramp generator 1500. The $I_{LOAD}$, CLK, $V_{DOWN\_RAMP}$, $V_{UP\_RAMP}$, $V_{COMP}$ and PWM signals are plotted versus time. The $V_{COMP}$ signal is superimposed with both the $V_{DOWN\_RAMP}$ and $V_{UP\_RAMP}$ signals to illustrate operation of the comparators CMP1 and CMP2. When the $I_{LOAD}$ signal jumps from $I_{NORM}$ to $I_{HIGH}$, the $V_{COMP}$ signal temporarily increases and the $I_{AVG}$ signal also increases causing early triggering the PWM signal.

Although the present invention has been described in considerable detail with reference to certain preferred versions thereof, other versions and variations are possible and contemplated. For example, the delay adjustment of the clock signal or the offset voltage added to the ramp signals and/or the compensation signals may be based on operational parameters other than output or load current, such as input voltage, a differential of output current and/or output voltage (e.g., a transient event or the like), etc. The present invention is also applicable to digital modulators in which the analog functions (e.g., ramps, error signals, compensation signals, etc.) are replaced by digital calculations and/or algorithms and the like. The present invention is applicable to modulators employing digital control, such as used to adjust the delay time, adjusting the clock signal, adjusting timing of PWM pulse activation, adjusting PWM duty cycle based on a calculation result, etc. Those skilled in the art should appreciate that they can readily use the disclosed conception and specific embodiments as a basis for designing or modifying other structures for providing out the same purposes of the present invention without departing from the spirit and scope of the invention.

What is claimed is:

1. An adaptive pulse positioning system for a voltage converter providing an output voltage, said adaptive pulse positioning circuit comprising:
   a pulse width modulation (PWM) generation circuit which generates a PWM signal comprising a plurality of PWM pulses for controlling the output voltage of the voltage controller, wherein said PWM signal comprises a predetermined number of PWM pulses per cycle of a clock signal;
   a sensor which senses an output load condition of the voltage converter and which provides a load signal indicative thereof; and
   a pulse positioning circuit, coupled to said sensor and said PWM generation circuit, which adaptively positions said plurality of PWM pulses based on said load signal without changing said predetermined number of PWM pulses per cycle of said clock signal.

2. The adaptive pulse positioning system of claim 1, wherein:
   said pulse positioning circuit comprises a delay function having a first input receiving said load signal, a second input receiving a first clock signal, and an output providing a delayed clock signal having a delay based on said load signal; and
   wherein said PWM generation circuit controls timing of said plurality of PWM pulses based on said delayed clock signal.

3. The adaptive pulse positioning system of claim 2, wherein said PWM generation circuit comprises:
   an error amplifier which provides a compensation signal indicative of error of the output voltage of the voltage controller;
   a signal generator having an input receiving said delayed clock signal and an output which provides a ramp signal;
   a comparator which compares said compensation signal with said ramp signal and which generates a PWM control signal indicative thereof; and
   PWM logic having a first input receiving said delayed clock signal, a second input receiving said PWM control signal and an output providing said PWM signal.

4. The adaptive pulse positioning system of claim 3, wherein said delayed clock signal comprises periodic clock pulses, wherein said signal generator provides a sawtooth waveform signal, and wherein said PWM logic comprises pulse timing circuit having a clock input receiving said delayed clock signal, a control input receiving said PWM control signal and an output providing said PWM signal.

5. The adaptive pulse positioning system of claim 3, wherein said delayed clock signal has a 50% duty cycle, wherein said signal generator provides a triangle waveform signal, and wherein said PWM logic comprises a pulse timing circuit having a clock input receiving said delayed clock signal, a control input receiving said PWM control signal and an output providing said PWM signal.

6. The adaptive pulse positioning system of claim 1, wherein:
   said PWM generation circuit comprises:
       a first ramp generator which provides a leading-edge ramp signal synchronous with a clock signal;
       an error amplifier which provides a first compensation signal indicative of error of the output voltage of the voltage controller;
       a first comparator which compares said leading-edge ramp signal with a second compensation signal and which asserts a set signal indicative thereof;
       a second ramp generator which provides a trailing-edge ramp signal that begins ramping when said set signal is asserted;
       a second comparator which compares said trailing-edge ramp signal with said first compensation signal and which asserts a reset signal indicative thereof; and
       pulse control logic which asserts said PWM signal when said set signal is asserted and de-asserts said PWM signal when said reset signal is asserted; and
   wherein said pulse positioning circuit has a first input receiving said first compensation signal, a second input receiving said load signal and an output providing said second compensation signal, and wherein said pulse positioning circuit adaptively adjusts said second compensation signal based on said load signal.

7. The adaptive pulse positioning system of claim 6, wherein:
   said sensor provides a sense signal indicative of output load current; and
   wherein said pulse positioning circuit comprises:
       a function block having an input receiving said sense signal and an output providing an offset voltage indicative thereof; and
       an adder which adds said first compensation signal to said offset voltage to provide said second compensation signal.

8. The adaptive pulse positioning system of claim 1, wherein:
said PWM generation circuit comprises:
a first ramp generator which provides a first leading-edge ramp signal synchronous with a clock signal;
an error amplifier which provides a compensation signal indicative of error of the output voltage of the voltage controller;
a first comparator which compares a second leading-edge ramp signal with said compensation signal and which asserts a set signal indicative thereof;
a second ramp generator which provides a trailing-edge ramp signal that begins ramping when said set signal is asserted;
a second comparator which compares said trailing-edge ramp signal with said compensation signal and which asserts a reset signal indicative thereof; and
pulse control logic which asserts said PWM signal when said set signal is asserted and de-asserts said PWM signal when said reset signal is asserted; and
wherein said pulse positioning circuit has a first input receiving said first leading-edge ramp signal, a second input receiving said load signal and an output providing said second leading-edge ramp signal, and wherein said pulse positioning circuit adaptively adjusts said second leading-edge ramp signal based on said load signal.

9. The adaptive pulse positioning system of claim 8, wherein:
said sensor provides a sense signal indicative of output load current; and
wherein said pulse positioning circuit comprises:
a function block having an input receiving said sense signal and an output providing an offset voltage indicative thereof; and
an adder which adds said first leading-edge ramp signal to said offset voltage to provide said second leading-edge ramp signal.

10. The adaptive pulse positioning system of claim 1, wherein:
said PWM generation circuit comprises:
a first ramp generator which provides a leading-edge ramp signal synchronous with a clock signal;
an error amplifier which provides a compensation signal indicative of error of the output voltage of the voltage controller;
a first comparator which compares said leading-edge ramp signal with said compensation signal and which asserts a set signal indicative thereof;
a second ramp generator which provides a trailing-edge ramp signal that begins ramping when said set signal is asserted;
a second comparator which compares said trailing-edge ramp signal with said compensation signal and which asserts a reset signal indicative thereof; and
pulse control logic which asserts said PWM signal when said set signal is asserted and de-asserts said PWM signal when said reset signal is asserted; and
wherein said pulse positioning circuit adjusts a slew rate of said leading-edge ramp signal based on said load signal.

11. The adaptive pulse positioning system of claim 10, wherein:
said first ramp generator comprises:
a capacitor;
a switch circuit, coupled to said capacitor, which charges said capacitor to a maximum voltage level synchronous with a clock signal; and
a controlled current sink, coupled to said capacitor, which discharges said capacitor at a slew rate based on a current control signal; and
wherein said pulse positioning circuit provides said current control signal based on said load signal.

12. A method of adaptively positioning pulse width modulation (PWM) pulses that are used to control an output voltage of a voltage regulator, comprising:
generating a series of PWM pulses based on a clock signal;
sensing an output load condition; and
adaptively shifting the series of PWM pulses based on the output load condition.

13. The method of claim 12, wherein said sensing an output load condition comprises sensing output load current.

14. The method of claim 12, wherein:
said generating a series of PWM pulses comprises:
delaying a first clock signal to provide a delayed clock signal;
generating a ramp signal based on the delayed clock signal;
generating a compensation signal based on an error of the output voltage of the voltage regulator;
comparing the ramp signal and the compensation signal and providing a control signal indicative thereof; and
asserting each PWM pulse based on the delayed clock signal and the control signal; and
wherein said adaptively shifting the series of PWM pulses comprises adaptively adjusting an amount of delay between the first clock signal and the delayed clock signal.

15. The method of claim 14, wherein:
said generating a ramp signal comprises initiating the ramp signal with each pulse of the delayed clock signal;
wherein said asserting each PWM pulse comprises initiating each PWM pulse with a corresponding pulse of the delayed clock signal and terminating each PWM pulse based on said control signal.

16. The method of claim 14, wherein:
said generating a ramp signal comprises generating a triangular waveform based on the delayed clock signal;
wherein said providing a control signal comprises asserting the control signal to a first level when the compensation signal is greater than the triangular waveform and asserting the control signal to a second level when the compensation signal is less than the triangular waveform;
wherein said asserting each PWM pulse comprises transitioning each PWM pulse based on the control signal.

17. The method of claim 12, wherein:
said generating a series of PWM pulses comprises:
providing a leading-edge ramp signal synchronous with the clock signal;
generating a first compensation signal based on an error of the output voltage of the voltage regulator;
comparing the leading-edge ramp signal with a second compensation signal and providing a set signal indicative thereof;
initiating a trailing-edge ramp signal when the set signal is provided;
comparing the trailing-edge ramp signal with the first compensation signal and providing a reset signal indicative thereof; and
initiating each PWM pulse when the set signal is provided and terminating each PWM pulse when the reset signal is provided; and
wherein said adaptively shifting the series of PWM pulses comprises:

generating an offset based on the output load condition; and adding the offset to the first compensation signal to provide the second compensation signal.

18. The method of claim 12, wherein:

said generating a series of PWM pulses comprises:

providing a first leading-edge ramp signal synchronous with the clock signal;

generating a compensation signal based on an error of the output voltage of the voltage regulator;

comparing a second leading-edge ramp signal with the compensation signal and providing a set signal indicative thereof;

initiating a trailing-edge ramp signal when the set signal is provided;

comparing the trailing-edge ramp signal with the compensation signal and providing a reset signal indicative thereof; and initiating each PWM pulse when the set signal is provided and terminating each PWM pulse when the reset signal is provided; and wherein said adaptively shifting the series of PWM pulses comprises:

generating an offset based on the output load condition; and adding the offset to the first leading-edge ramp signal to provide the second leading-edge ramp signal.

19. The method of claim 12, wherein:

said generating a series of PWM pulses comprises:

providing a leading-edge ramp signal synchronous with the clock signal;

generating a compensation signal based on an error of the output voltage of the voltage regulator;

comparing the leading-edge ramp signal with the compensation signal and providing a set signal indicative thereof;

initiating a trailing-edge ramp signal when the set signal is provided;

comparing the trailing-edge ramp signal with the compensation signal and providing a reset signal indicative thereof; and initiating each PWM pulse when the set signal is provided and terminating each PWM pulse when the reset signal is provided; and wherein said adaptively shifting the series of PWM pulses comprises adjusting a slew rate of the leading-edge ramp signal based on the output load condition.

20. The method of claim 19, wherein said providing the leading-edge ramp signal and said adjusting a slew rate of the leading-edge ramp signal comprises charging a capacitor to a predetermined level synchronous with the clock signal and discharging the capacitor at a rate based on the output load condition.

* * * * *